Patented Sept. 23, 1924.

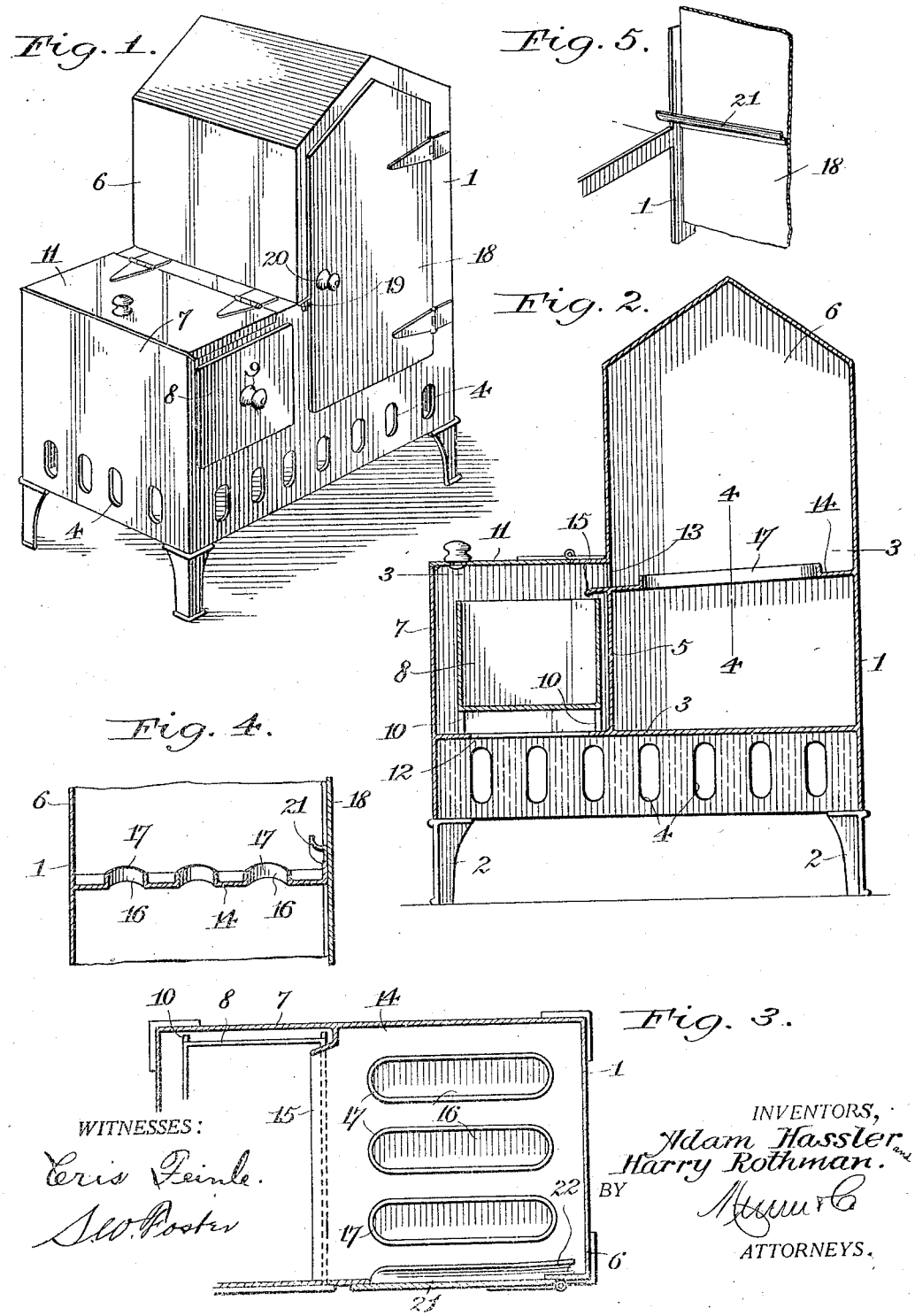

1,509,752

UNITED STATES PATENT OFFICE.

ADAM HASSLER, OF FORT LEE, NEW JERSEY, AND HARRY ROTHMAN, OF BROOKLYN, NEW YORK.

COMBINATION COOKER AND STEAMER.

Application filed February 14, 1924. Serial No. 692,825.

*To all whom it may concern:*

Be it known that we, ADAM HASSLER, a citizen of the United States, and a resident of Fort Lee, in the county of Bergen and State of New Jersey, and HARRY ROTHMAN, a citizen of the United States, and a resident of the city of New York, borough of Brooklyn, in the county of Kings and State of New York, have invented a new and Improved Combination Cooker and Steamer, of which the following is a full, clear, and exact description.

This invention relates to combination cookers and steamers, an object of the invention being to provide an apparatus of this character in which the steam and vapor from the cooker passes into the steamer, and the water as it condenses in the steamer is returned to the water compartment of the cooker so that while foodstuffs may be kept warm within the steamer they are kept free from an accumulation of moisture and also dripping from the steamer is prevented when the door is opened.

A further object is to provide an apparatus of this character which is especially designed as a cooker for sausages and the like which are boiled in water, and utilize the steam from said boiling water to keep the steamer compartment warm and free from accumulated moisture.

A further object is to provide an apparatus of this character in which a single burner is utilized both for heating the water in the cooker and maintaining a warm temperature in the steamer; hence, an economy of fuel as well as an economy of space and improved results in the storing of food is had.

A further object it to provide an apparatus of this character which may be manufactured and sold at a reasonably low price, which will be neat and attractive in appearance, and which will most efficiently perform the functions for which it is intended.

With these and other objects in view, the invention consists in certain novel features of construction and combinations and arrangements of parts which will be more fully hereinafter described and pointed out in the claims.

In the accompanying drawings—

Figure 1 is a perspective view of our improved apparatus;

Figure 2 is a view in vertical longitudinal section thereof;

Figure 3 is a fragmentary view in horizontal section on the line 3—3 of Figure 2;

Figure 4 is a fragmentary view in vertical section on the line 4—4 of Figure 2;

Figure 5 is a fragmentary perspective view illustrating the position of the door gutter when the door of the steamer is opened.

Our improved apparatus comprises a single metallic casing 1, which is supported on suitable feet 2 at the desired elevation, and is made with a bottom 3 located at appreciable distance above the bottom of casing 1 so as to provide an ample depending apron below the bottom which is perforated as shown at 4. The casing 1 is appreciably higher or of greater vertical dimension at one side or end than the other end and these two portions are divided by a vertical partition 5 so that the portion of the casing at one side of the partition constitutes a relatively high steamer 6 and a relatively low cooker 7. The cooker 7 is provided with a food compartment 8, which structurally is a drawer extending through the front of the cooker and having a suitable knob or handle 9 thereon to facilitate its movement.

The inner end of the receptacle 8 is supported on suitable feet 10 so that the drawer may freely slide. A hinged cover 11 constitutes the greater portion of the top of the cooker 7, and, as this device is particularly adapted for cooking sausages and the like, the provision of such a cover to permit the entrance of the sausages in the water at the beginning of the cooking operation is desirable, and the provision of the receptacle in the form of a drawer to allow it to be pulled out and a single sausage removed without the entire escape of vapor or steam after the operation is started is also of great advantage. In other words, if it were necessary, as in similar devices on the market, to raise the cover every time a sausage is to be taken out, a vast amount of steam will escape and, furthermore, will be annoying both to the customer and to the merchant.

An opening 12 is formed in the bottom 3 directly below the receptacle 8 so that any form of burner may be located under the cooker in line with the opening 12 and the flame and heat thereof may be directed against the bottom of the receptacle 8 so as to quickly heat the contents thereof and to maintain them hot with a low fuel consumption. The partition 5 separating the cooker 7 from the steamer 6 is made with an opening 13 at its upper end and this opening 13 permits the steam and vapor from the cooker to pass freely into the steamer so that they are utilized for heating food or other articles stored in the steamer.

We have not attempted to illustrate any particular arrangement of supporting trays and the like but it is, of course, to be understood that the steamer 6 may be equipped with any suitable arrangement of supports for food or other articles therein. 14 represents a water-guiding tray which extends at an angle across the steamer 6 and over the partition 5 through the opening 13, where it has a relatively wide spout 15 above the receptacle 8 so as to direct the condensed water back into the receptacle. To allow a circulation through the tray 14, openings 16 are made in the tray with upstanding flanges or walls 17 around the same to prevent the water from passing through the openings. A hinged door 18 constitutes a closure for the front of the steamer and may have any suitable form of catch or latch 19 and any suitable knob or handle 20 to manipulate the same. On the inner face of the door 18 a gutter 21 is secured. This gutter 21 is inclined and has its outlet end 22 extended slightly beyond the hinged edge of the door 18 so that even when the door is open the spout will guide water condensing against the inner face of the door back into the steamer onto the tray 14, as is clearly illustrated in Figure 5.

It will thus be noted that with our improved combination apparatus we utilize a single burner, which serves to cook the sausages or other articles, and the steam or vapor in the cooker is utilized to heat the steamer, and the water which condenses in the steamer is directed back into the cooker. This is not only an economical apparatus but it is most convenient and lacks the disagreeable effect upon foodstuffs which is common with steamers where the water can condense on the supports and on the food and on the operator.

Various slight changes and alterations might be made in the general form of the parts described without departing from our invention and hence we do not limit ourselves to the precise details set forth but consider ourselves at liberty to make such slight changes and alterations as fairly fall within the spirit and scope of the appended claims.

We claim:

1. An apparatus of the character described, comprising a casing, a steamer, and a cooker constituting each a part of the casing and located side by side, a tray located intermediate the top and bottom of the steamer and directing condensation back into the cooker, a door normally closing the front of the steamer and a gutter on the inner face of the door discharging onto the tray when the door is closed and also when the door is opened.

2. An apparatus of the character described, comprising a casing, a steamer and a cooker constituting each a part of the casing and located side by side, the cooker having its top in a plane appreciably lower than the top of the steamer, a partition separating the steamer and cooker and having an opening in its upper portion for the passage of steam and vapor into the steamer, and a tray located above the bottom of the steamer directing the condensation back into the cooker.

3. An apparatus of the character described, comprising a cooker, a steamer located beside the same and receiving steam and vapor therefrom, a cover on the cooker, and a sliding drawer in the cooker adapted to contain water and the food to be cooked, said cooker having an opening in its bottom through which heat may be directed against the bottom of the drawer.

ADAM HASSLER.
HARRY ROTHMAN.